United States Patent
Vu et al.

(10) Patent No.: US 7,426,618 B2
(45) Date of Patent: Sep. 16, 2008

(54) SNAPSHOT RESTORE METHOD AND APPARATUS

(75) Inventors: Ngoclan Thi Vu, Irvine, CA (US); James George Wayda, Laguna Niguel, CA (US)

(73) Assignee: Dot Hill Systems Corp., Carlsbad, CA (US)

( * ) Notice: Subject to any disclaimer, the term of this patent is extended or adjusted under 35 U.S.C. 154(b) by 33 days.

(21) Appl. No.: 11/277,738

(22) Filed: Mar. 28, 2006

(65) Prior Publication Data

US 2007/0055833 A1     Mar. 8, 2007

Related U.S. Application Data

(60) Provisional application No. 60/714,904, filed on Sep. 6, 2005.

(51) Int. Cl.
    *G06F 12/00*    (2006.01)
(52) U.S. Cl. .................... 711/162; 711/165; 711/114
(58) Field of Classification Search .............. None
    See application file for complete search history.

(56) References Cited

U.S. PATENT DOCUMENTS

| | | | |
|---|---|---|---|
| 5,963,962 A | 10/1999 | Hitz et al. | |
| 6,289,356 B1 | 9/2001 | Hitz et al. | |
| 6,557,079 B1 | 4/2003 | Mason, Jr. et al. | |
| 6,615,223 B1 | 9/2003 | Shih et al. | |
| 6,771,843 B1 | 8/2004 | Huber et al. | |
| 2002/0091670 A1 | 7/2002 | Hitz et al. | |
| 2003/0154314 A1* | 8/2003 | Mason et al. | 709/250 |
| 2003/0229764 A1 | 12/2003 | Ohno et al. | |
| 2004/0030727 A1 | 2/2004 | Armangau | |
| 2004/0030951 A1 | 2/2004 | Armangau | |
| 2004/0093555 A1 | 5/2004 | Therrien et al. | |
| 2004/0133718 A1 | 7/2004 | Kodama et al. | |
| 2004/0172509 A1 | 9/2004 | Takeda et al. | |
| 2004/0260673 A1 | 12/2004 | Hitz et al. | |
| 2004/0267836 A1* | 12/2004 | Armangau et al. | 707/203 |

(Continued)

FOREIGN PATENT DOCUMENTS

CA     2165912     6/1997

(Continued)

OTHER PUBLICATIONS

Written Opinion from the PCT dated Mar. 27, 2007 with regard to corresponding PCT Application No. PCT/US/06/32506, 10 pages.

(Continued)

*Primary Examiner*—Reginald G. Bragdon
*Assistant Examiner*—Ngoc V Dinh
(74) *Attorney, Agent, or Firm*—Sheridan Ross P.C.

(57) ABSTRACT

Methods and apparatuses for providing a data storage system having snapshot restore capabilities are provided. In particular, snapshots may be taken to represent a state of a storage volume at different times. The state of the storage volume may be returned to the state represented by any snapshot even while the storage volume continues to accept read and write operations. Furthermore, these features are provided in the context of a sparse snapshot structure, according to which multiple copies of individual data chunks are not maintained by the data storage system.

22 Claims, 10 Drawing Sheets

U.S. PATENT DOCUMENTS

| | | |
|---|---|---|
| 2005/0044088 A1 | 2/2005 | Lindsay et al. |
| 2005/0066128 A1* | 3/2005 | Yagisawa et al. ............ 711/114 |
| 2005/0071393 A1 | 3/2005 | Ohno et al. |
| 2005/0166022 A1 | 7/2005 | Watanabe |
| 2005/0193180 A1 | 9/2005 | Fujibayashi et al. |
| 2005/0198452 A1 | 9/2005 | Watanabe |
| 2005/0246397 A1 | 11/2005 | Edwards et al. |
| 2005/0246503 A1 | 11/2005 | Fair |

FOREIGN PATENT DOCUMENTS

| | | |
|---|---|---|
| EP | 1003103 | 5/2000 |
| WO | WO9429807 | 12/1994 |
| WO | WO2005111773 | 11/2005 |
| WO | WO2005111802 | 11/2005 |

OTHER PUBLICATIONS

International Search Report from the PCT dated Mar. 27, 2007 with regard to corresponding PCT Application No. PCT/US/06/32506, 3 pages.

International Preliminary Report on Patentability and Written Opinion from the PCT dated Mar. 20, 2008 with regard to corresponding PCT Application No. PCT/US/06/032506, 10 pages.

Written Opinion form the PCT dated Mar. 27, 2007 with regard to corresponding PCT Application No. PCT/US/06/32506, 10 pages.

International Search Report from the PCT dated Mar. 27, 2007 with regard to corresponding PCT Application No. PCT/US/06/632506, 3 pages.

* cited by examiner

SNAPSHOT RESTORE METHOD AND APPARATUS

CROSS REFERENCE TO RELATED APPLICATIONS

This Application claims the benefit of U.S. Provisional Application No. 60/714,904, filed Sep. 6, 2005, the entire disclosure of which is hereby incorporated herein by reference.

FIELD

The present invention is directed to a data storage system controller. In particular, the present invention is directed to methods and apparatuses for restoring data in data storage systems.

BACKGROUND

The need to store digital files, documents, pictures, images and other data continues to increase rapidly. In connection with the electronic storage of data, various data storage systems have been devised for the rapid and secure storage of large amounts of data. Such systems may include one or a plurality of storage devices that are used in a coordinated fashion. Systems in which data can be distributed across multiple storage devices such that data will not be irretrievably lost if one of the storage devices (or in some cases, more than one storage device) fails are also available. Systems that coordinate operation of a number of individual storage devices can also provide improved data access and/or storage times. Examples of systems that can provide such advantages can be found in the various RAID (redundant array of independent disks) levels that have been developed. Whether implemented using one or a plurality of storage devices, the storage provided by a data storage system can be treated as one or more storage volumes.

In order to facilitate the availability of desired data, it is often desirable to maintain different versions of a data storage volume. By maintaining different versions, disaster recovery is facilitated. For example, if a virus causes a current storage volume version to be lost or otherwise unusable, the system can be rolled back to an earlier version that does not include the file that introduced the virus. However, maintaining different versions of data storage volumes is expensive and inefficient, as it requires maintaining complete copies of each storage volume version. This problem is multiplied if a number of backup versions of a storage volume are maintained. In addition, once a different version of a storage volume is restored, it is often impossible to revert to another version, for example if the restored volume is determined to be less desirable than the storage volume previously applied. Also, a storage volume selected in connection with a restore operation is often not available immediately, and the ability to create additional versions of the storage volume may be impossible while rollback to the selected storage volume is being completed.

SUMMARY

The present invention is directed to solving these and other problems and disadvantages of the prior art. In accordance with embodiments of the present invention, a data storage system capable of using metadata to efficiently maintain one or more snapshots of a storage volume at different times is provided. More particularly, only one copy of each piece of data in a storage volume is maintained, even if a piece of data is applicable to more than one version of the data storage volume. Metadata is used to track the versions of the data storage volume to which each piece or subset of data pertains. Accordingly, embodiments of the present invention may be considered to comprise sparse snapshots. In accordance with embodiments of the present invention, the storage volume remains operational, even during operations restoring the state of the storage volume to a selected restore point. In addition, a selected state of the master storage volume, as represented by a snapshot, is immediately available following a decision to restore the master storage volume to that selected state. As used herein, data in a selected state as represented by a snapshot is immediately available where the user is not required to wait for all of the data within a master storage volume to be processed before a requested chunk of data can be accessed.

In accordance with embodiments of the present invention, a snapshot is a block level point-in-time representation of data on a storage volume. The data is essentially frozen in time at the instant that the snapshot is taken. Although data on the storage volume may change as a result of write operations, the data within the snapshot will remain constant and frozen in time at the instant that the snapshot was taken. In order to preserve snapshot data, a repository (or backing store) is used to store data that is not otherwise represented in the storage volume and snapshot metadata. All data and metadata associated with the snapshot is stored in the repository. In accordance with embodiments of the present invention, data stored within the snapshot is stored in "chunks." A chunk is equivalent to a number of logical data blocks (LBAs). Alternatively or in addition, data can be stored within sub-chunks. A sub-chunk is a fixed size subset of a chunk. The units (e.g. chunks, sub-chunks or multiples thereof) that are used for creating and managing snapshots can be selected to optimize the performance of the system.

When a snapshot is initially created, it does not contain any data. Instead, snapshot metadata refers to the data that is contained on the storage volume. As a result, if a read operation is directed to the snapshot while the snapshot is in this initial condition, the snapshot metadata will redirect the read operation to the storage volume. If a write operation is directed to the storage volume after the snapshot is created, the metadata of the snapshot is checked to determine if a data chunk that is about to be overwritten contains data that has been previously written to the snapshot. If it has, then the write operation is allowed to complete normally. If the write operation would overwrite a chunk of data that has not yet been written to the snapshot, then a copy-on-write (COW) operation is initiated. The COW operation comprises reading the existing chunk of data in the storage volume that is about to be overwritten and copying that chunk to the snapshot. The snapshot metadata is then updated to indicate that the data chunk is now contained in the snapshot. The write operation to the storage volume is then allowed to complete.

In accordance with further embodiments of the present invention, a storage volume can be restored to any existing point-in-time snapshot of that volume, while maintaining all existing older and newer snapshots. In particular, all existing snapshots of the storage volume are maintained, allowing the version of the volume that is active to be rolled forward or backward to any existing snapshot. As a result, a system administrator or other user has the ability to change their decision regarding the storage volume that is selected as the active or master storage volume.

Embodiments of the present invention also allow immediate access to a restored master storage volume. In particular, blocks of data that need to be copied from the selected snapshot to the active storage volume as part of a restore operation can be accessed from the snapshot data, while blocks of data that have already been copied to the master storage volume, or that are already current as they exist in the master storage volume are available from the master storage volume. That is, requested blocks of data are available in their restored state, even if restore processing for the entire master storage volume has not yet been completed. The ability to use either data obtained from the snapshot or from the master storage volume while a background copy operation restoring the master storage volume from the snapshot is in process is made possible by the use of a high-watermark to track whether data should be obtained directly from the storage volume or from the snapshot. The high water mark may be maintained by a restore thread that is used to move data from the snapshot to the master volume. Immediate access is also available to other versions of the storage volume if a decision is made to abort a restore from a previously selected snapshot to the storage volume and to select a different version represented by a different snapshot. Additional snapshots of the master storage volume can also be taken while a restore operation to a selected snapshot is in progress. Other embodiments of the present invention associate a restore marker with data chunks to allow data chunks that have already been restored from a snapshot volume to the master storage volume to be identified.

Additional features and advantages of embodiments of the present invention will become more readily apparent from the following description, particularly when taken together with the accompanying drawings.

DETAILED DESCRIPTION

Figure 1:
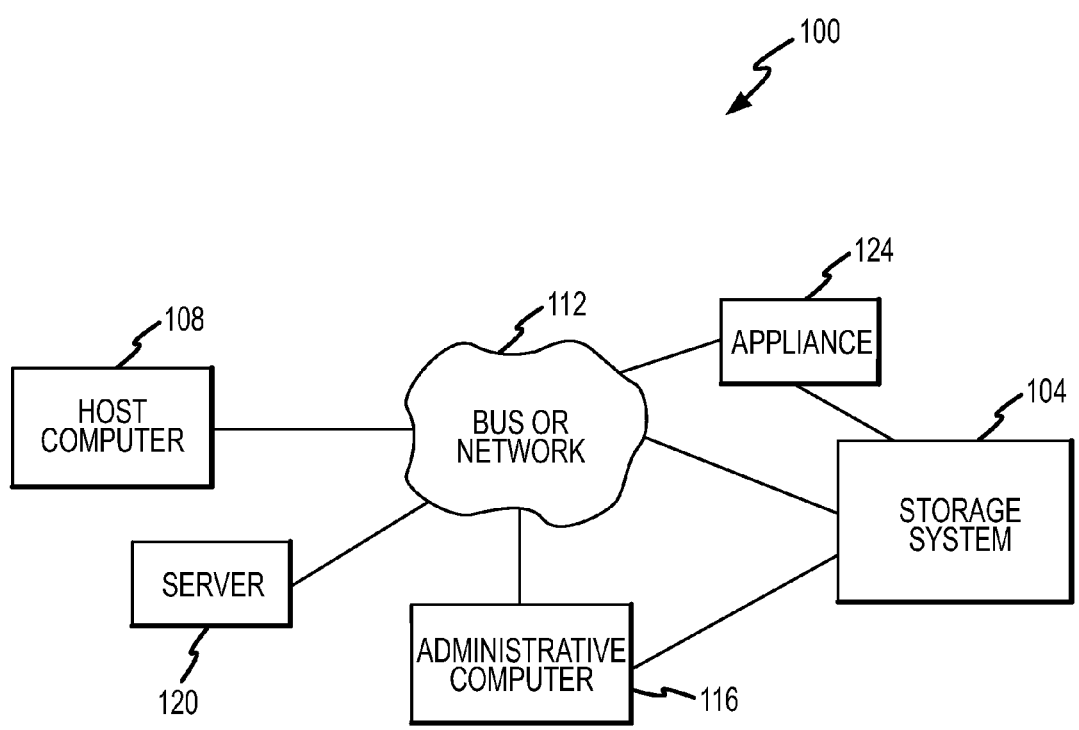
FIG. 1 is a functional block diagram depicting components of an electronic data system incorporating a data storage system in accordance with embodiments of the present invention.

FIG. 1 is a block diagram depicting an electronic data system 100 incorporating a data storage system 104 in accordance with embodiments of the present invention. In general, the data storage system 104 may be interconnected to one or more host processors or computers 108 by a bus and/or network 112. Accordingly, embodiments of the present invention have applications in association with single or multiple hosts 108 in storage area network (SAN) or direct connect environments. In accordance with still other embodiments, a data storage system 104 may be integrated with or directly connected to a host 108. In addition, a storage system 104 may be interconnected to an administrative computer 116. In general, an administrative computer 116 may provide a user interface for controlling aspects of the operation of the storage system 104. The administrative computer 116 may be interconnected to the storage system 104 directly, and/or through a bus or network 112. In accordance with still other embodiments of the present invention, an administrative computer 116 may be integrated with a host computer 108. In addition, multiple administrative computers 116 may be provided as part of the electronic data system 100. An electronic data system 100 may also include multiple data storage systems 104.

The electronic data system 100 may also include a server 120, providing snapshot restore services as described herein. The server 120 may be interconnected to the storage system 104 through the bus or network 112. Alternatively or in addition, snapshot restore functions may be provided by a storage appliance 124 interposed along a data channel interconnecting the storage system 104 and the bus or network 112, or interconnecting the storage system 104 and a host computer 108. In accordance with still other embodiments of the present invention, snapshot restore functions as described herein can be provided, in whole or in part, by the execution of instructions or programming by the storage system 104. As still another alternative, snapshot restore functions may be provided by a host 108 or administrative computer 116.

Figure 2:
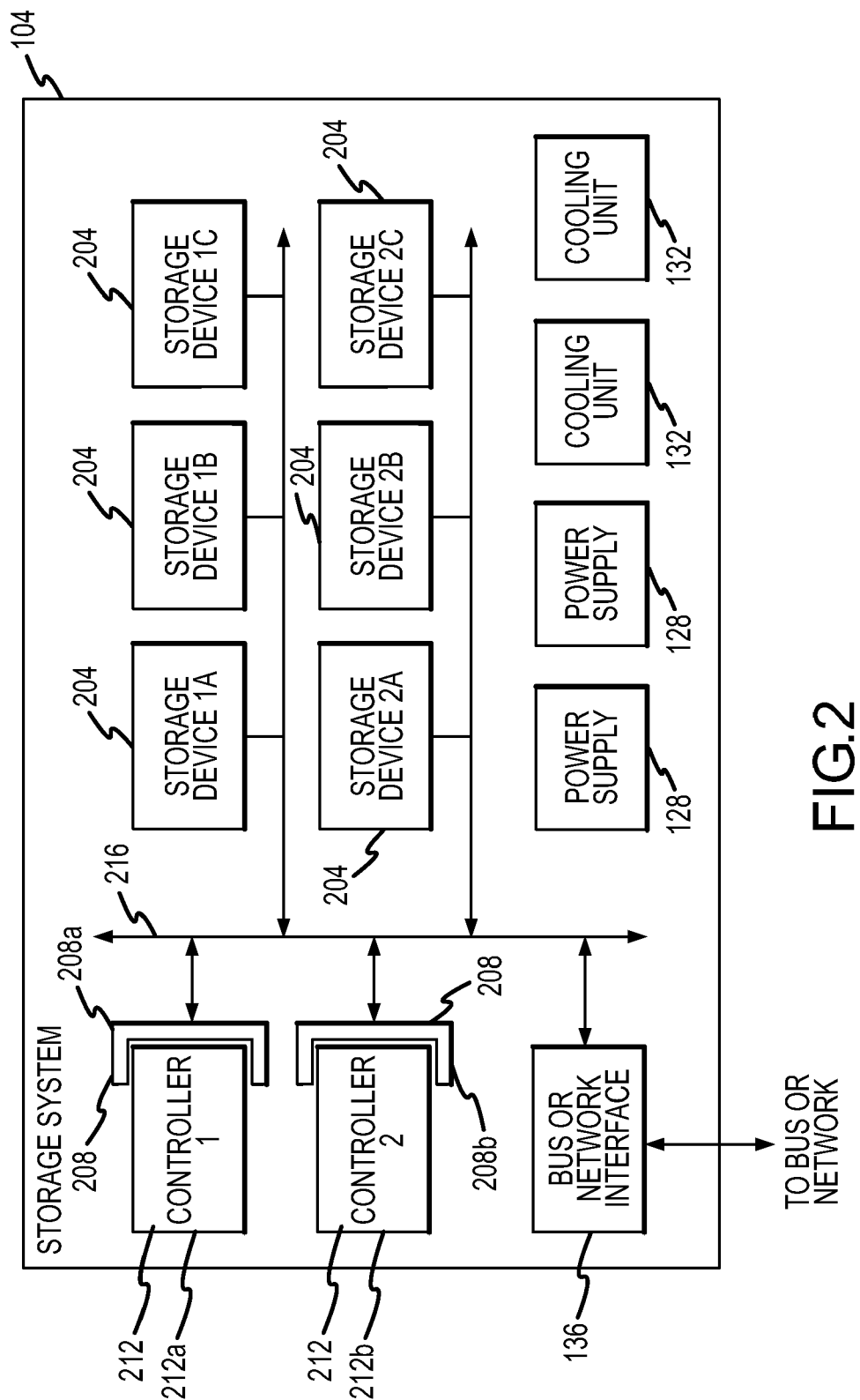
FIG. 2 is a block diagram depicting components of a data storage system in accordance with embodiments of the present invention.

FIG. 2 illustrates components that may be included in an example data storage system 104 comprising a RAID system in accordance with embodiments of the present invention. In general, the data storage system 104 includes a number of storage devices 204. Examples of storage devices 204 include hard disk drives, such as serial advanced technology attachment (SATA), small computer system interface (SCSI), serial attached SCSI (SAS), Fibre Channel (FC), or parallel advanced technology attached (PATA) hard disk drives. Other examples of storage devices 204 include magnetic tape storage devices, optical storage devices or solid state disk devices. Furthermore, although a number of storage devices 204 are illustrated, it should be appreciated that embodiments of the present invention are not limited to any particular number of storage devices, and that a lesser or greater number of storage devices 204 may be provided as part of a data storage system 104. As can be appreciated by one of skill in the art, arrays and/or array partitions, hereinafter referred to as logical unit members (LUNs), may be established on the data storage devices 204. As can be further appreciated by one of skill in the art, a LUN may be implemented in accordance with any one of the various array levels or other arrangements for storing data on one or more storage devices 104. As can also be appreciated by one of skill in the art, the storage devices 204 contain data comprising a master storage volume, which may correspond to a LUN, and one or more snapshots of the storage volume taken at different times.

A data storage system 104 in accordance with embodiments of the present invention may be provided with a first controller slot 208a. In addition, other embodiments may include additional controller slots, such as a second controller slot 208b. As can be appreciated by one of skill in the art, a controller slot 208 may comprise a connection or set of connections to enable a controller 212 to be operably interconnected to other components of the data storage system 104. Furthermore, a data storage system 104 in accordance with embodiments of the present invention includes at least one controller 212a. For example, while the data storage system 104 is operated in a single controller, non-failover mode, the data storage system 104 may include exactly one controller 212. A data storage system 104 in accordance with other embodiments of the present invention may be operated in a dual redundant active-active controller mode by providing a second controller 212b. When a second controller 212b is used in addition to a first controller 212a, the second controller 212b is received by a second controller slot 208b. As can be appreciated by one of skill in the art, the provision of two controllers, 212a to 212b, permits data to be mirrored between the controllers 212a-212b, providing redundant active-active controller operation.

One or more busses or channels 216 are generally provided to interconnect a controller or controllers 212 through the associated controller slot or slots 208 to the storage devices 204. Furthermore, while illustrated as a single shared bus or channel 216, it can be appreciated that a number of dedicated and/or shared buses or channels may be provided. Additional components that may be included in a data storage system 104 include one or more power supplies 128 and one or more cooling units 132. In addition, a bus or network interface 136 may be provided to interconnect the data storage system 104 to the bus or network 112, and/or to a host computer 108 or administrative computer 116.

Although illustrated as a complete RAID system in FIG. 2, it should be appreciated that the data storage system 104 can comprise one or more storage volumes implemented in various other ways. For example, the data storage system 104 may comprise a hard disk drive or other storage device 204 connected or associated with a server or a general purpose computer. As further examples, the storage system 104 may comprise a Just a Bunch of Disks (JBOD) system or a Switched Bunch of Disks (SBOD) system.

The snapshot restore method and apparatus may be implemented in various ways. For example, the snapshot restore functions may be implemented in connection with a server 120 interconnected to a storage system 104 by a bus or network 112, or in connection with some other computing device, such as a host computer 108 or an administrative computer 116. According to further embodiments, the snapshot method and apparatus may be implemented in connection with an appliance 124 that is inline between the data storage system 104 and a host computer 108. In accordance with still other embodiments of the present invention, the snapshot functions may be provided in connection with the operation or execution of instructions or code by a component or a subsystem of the data storage system 104, such as by a data storage system controller 212.

Figure 3A:
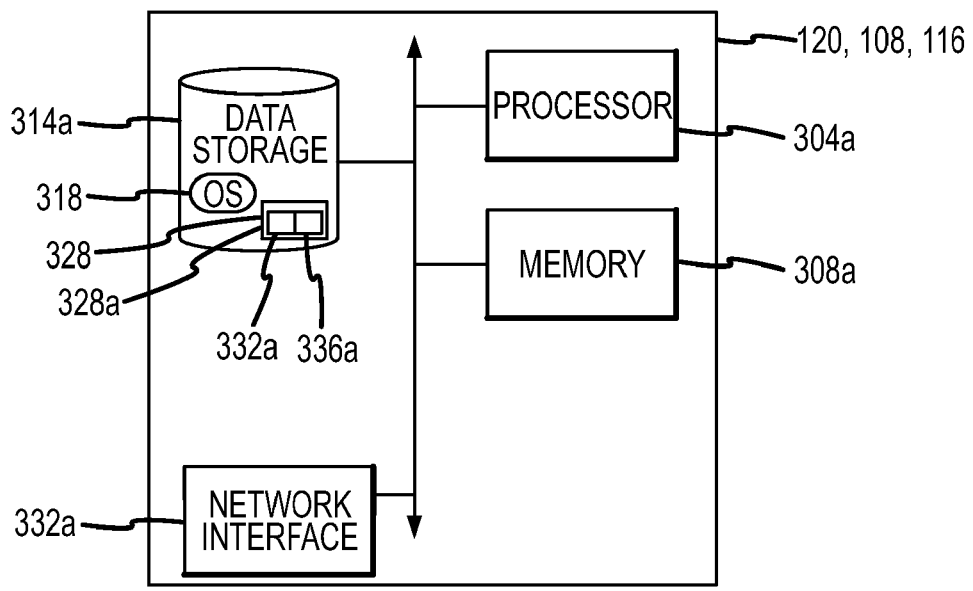
FIG. 3A is a block diagram depicting components of a host, administrative computer or server in accordance with embodiments of the present invention.

With reference to FIG. 3A, an exemplary host 108, administrative computer 116, server 120 or other device in connection with an embodiment of the present invention in which the snapshot functions are provided by software running on the device 108, 116 or 120 is illustrated. The components may include a processor 304a capable of executing program instructions. Accordingly, the processor 304a may include any general purpose programmable processor or controller for executing application programming. Alternatively, the processor 304a may comprise a specially configured application specific integrated circuit (ASIC). The processor 304a generally functions to run programming code including operating system software, and one or more applications implementing various of the functions performed by the device 108, 116 or 120.

The device 108, 116 or 120 may additionally include memory 308a of using connection with the execution of programming by the processor 304a, and for the temporary or long term storage of data or program instructions. For example, the memory 308a may be used in connection with the execution of a snapshot restore algorithm. The memory 308a may comprise solid state memory resident, removable or remote in nature, such as DRAM and SDRAM.

Data storage 314a may also be included for the storage of application programming and/or data. For example, operating system software 318 may be stored in the data storage 314a. In addition, the data storage 314a may be used to store a snapshot restore process or application 328a comprising instructions for providing snapshots of the storage volume and restoration functions as described herein. The snapshot restore application 328a may itself include a number of modules or components, such as a main input/output (IO) module 332a and a restore thread or module 336a.

A device 108, 116 or 120 may also include one or more network interfaces 340a. Examples of a network interface 340a include a Fibre Channel (FC) interface, Ethernet, or any other type of communication interface. As can be appreciated by one of skill in the art, a network interface 340a may be provided in the form of a network interface card or other adapter.

A host computer 108 or administrative computer 116 implementing or providing snapshot restore 328 application or functions may include the same general components as the server 120. In particular, a host computer 108 or an administrative computer 116 providing snapshot restore application 328 functions would generally include data storage 314a containing operating system 318 and snapshot restore application 328a instructions, a processor 304a for executing those instructions, memory 308a for use in connection with the execution of those instructions, and a network interface 340a. A host computer 108 or an administrative computer 116 would, however, generally include additional application programming, for providing other features, and additional components. For instance, a host computer 108 might include one or more applications for serving, creating and/or using data stored in a data storage system 104. As another example, an administrative computer 116 may include application programming for administering aspects of a data storage system 104. Additional components that may be included as a host computer 108 or an administrative computer 116 include user input and output devices.

Figure 3B:
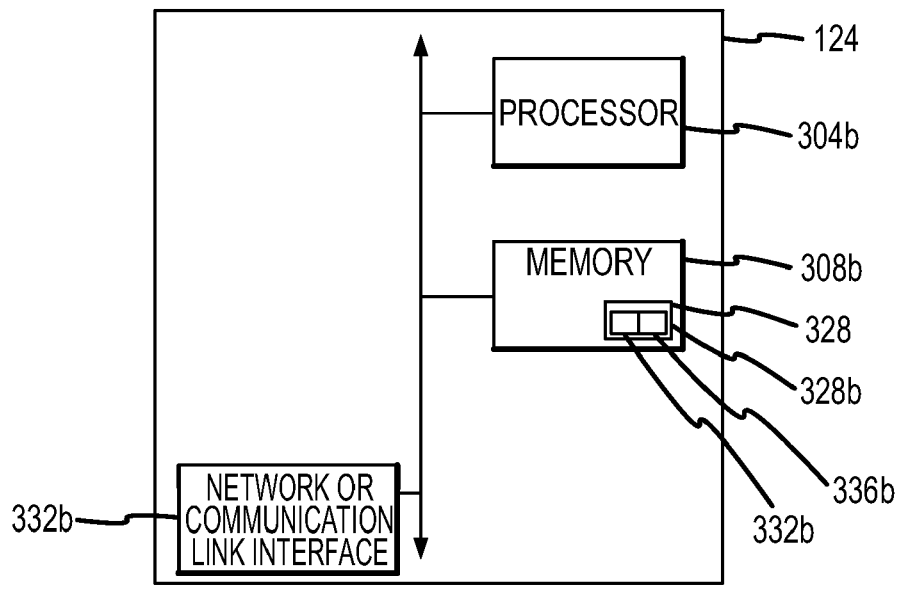
FIG. 3B is a block diagram depicting components of a storage appliance in accordance with embodiments of the present invention.

With reference to FIG. 3B, components that may be included as part of a network or storage appliance 124 are illustrated. In general, the components include a processor 304b, memory 308b and one or more network or communication link interfaces 340b. The network appliance 124 is generally characterized by being inserted in a communication path or link between a host computer 108 and the data storage system 104. Alternatively or in addition, the appliance 124 is characterized by executing firmware implementing a snapshot restore algorithm or process 328b in accordance with embodiments of the present invention in which the snapshot restore algorithm 328b is stored or encoded as firmware. In accordance with embodiments of the present invention, the snapshot restore algorithm or process 328*b* may be stored or encoded in memory 308*b* provided as part of the appliance 124.

Figure 3C:
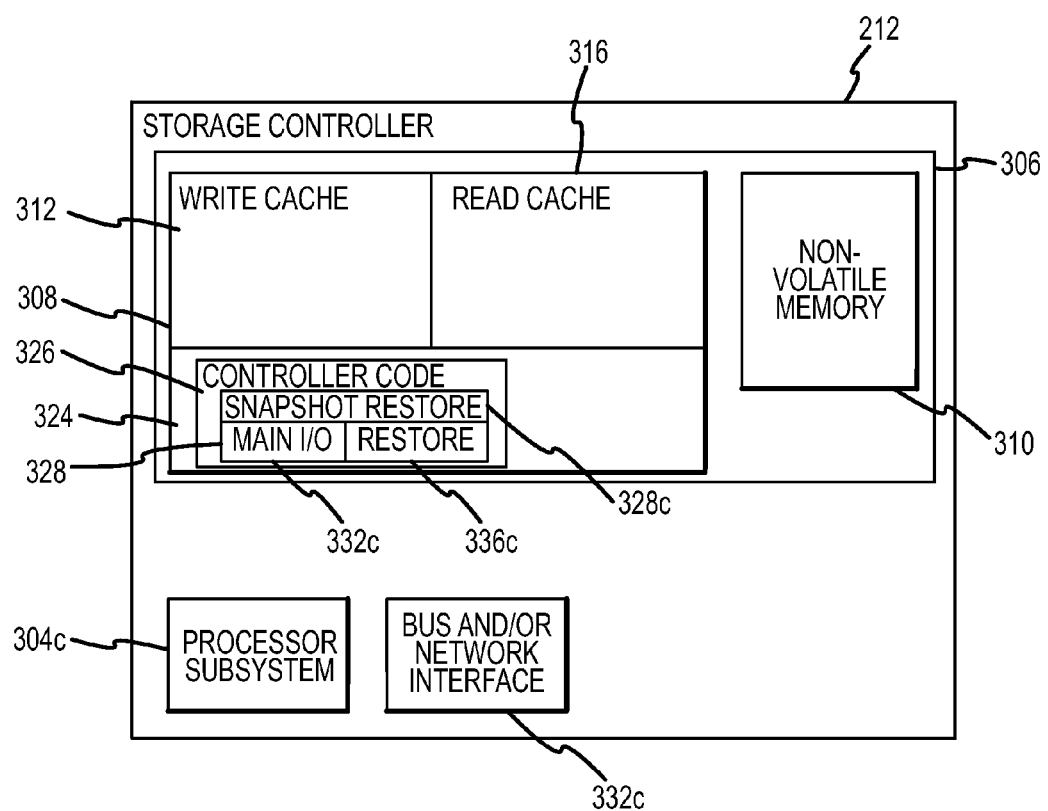
FIG. 3C is a block diagram depicting components of a storage controller in accordance with embodiments of the present invention.

As noted above, a snapshot restore algorithm or process 328 in accordance with embodiments of the present invention may also be implemented in connection with the operation of a data storage system 104 storage controller 212. A storage controller 212 providing snapshot restore application or process 328 functions in accordance with embodiments of the present invention, shown as snapshot restore instructions 328*c*, is illustrated in FIG. 3C. In general, the storage controller 212 includes a processor or processor subsystem 304*c* capable of executing instructions for performing, implementing and/or controlling various controller 212 functions. Such instructions may include instructions 328*c* for implementing aspects of a snapshot restore method and apparatus as described in the present disclosure. Furthermore, such instructions may be stored as software and/or firmware. As can be appreciated by one of skill in the art, operations concerning the generation of parity data or other operations may be performed using one or more hardwired and or programmable logic circuits provided as part of the processor subsystem 304*c*. Accordingly, the processor subsystem 304*c* may be implemented as a number of discrete components, such as one or more programmable processors in combination with one or more logic circuits. Processor subsystem 304*c* may also include or be implemented as one or more integrated devices or processors. For example a processor subsystem may comprise a complex programmable logic device (CPLD).

A controller 212 also generally includes memory 306. The memory 306 is not specifically limited to memory of any particular type. For example, the memory 306 may comprise a solid state memory device, or a number of solid state memory devices. In addition, the memory 306 may include separate volatile memory 308 and non-volatile memory 310 portions. As can be appreciated by one of skill in the art, the memory 306 typically includes a write cache 312 and a read cache 316 that are provided as part of the volatile memory 308*c* portion of the memory 306, although other arrangements are possible. By providing caches 312, 316, a storage controller 212 can improve the speed of input/output (IO) operations between a host 108 and the data storage devices 204 comprising an array or array partition. Examples of volatile memory 308*c* include DRAM and SDRAM.

The non-volatile memory 310 may be used to store data that was written to the write cache 312 of memory 306 in the event of a power outage affecting the data storage system 104. The non-volatile memory portion 310 of the storage controller memory 306*c* may include any type of data memory device that is capable of retaining data without requiring power from an external source. Examples of non-volatile memory 310 include, but are not limited to, compact flash or other standardized non-volatile memory devices.

The memory 306 also includes portions of the memory 306 comprising a region 324 that provides storage for controller code 326. The controller code 326 may comprise a number of components, including a snapshot restore process or application 328*c* comprising instructions for providing snapshots of the storage volume and restoration functions as described herein. The snapshot restore application 328*c* may itself include a number of modules, such as a main input/output (IO) module 332*c* and a restore thread or module 336*c*. As shown in FIG. 3, the controller code region 324 may be established in a volatile memory 308 portion of the storage controller memory 306. Alternatively or in addition, controller code 326 may be stored in non-volatile memory 310.

A storage controller 212 may additionally include other components. For example, a bus and/or network interface 340*c* may be provided for operably interconnecting the storage controller 212 to the remainder of the data storage system 104, for example through a controller slot 208 and a bus or channel 216. Furthermore, the interface 340*c* may be configured to facilitate removal or replacement of the storage controller 212 in a controller slot 208 as a field replaceable unit (FRU). In addition, integral signal and power channels may be provided for interconnecting the various components of the storage controller 212 to one another.

Figure 4:
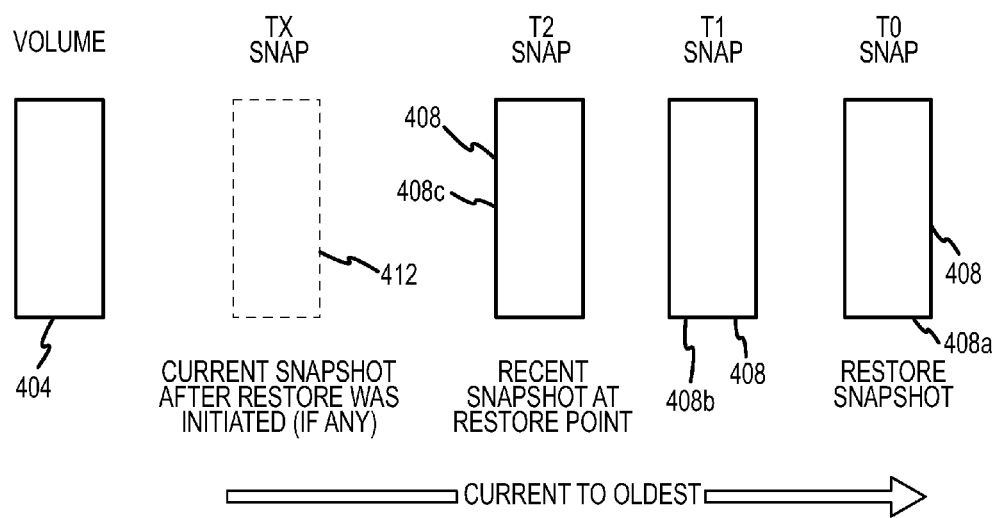
FIG. 4 is a block diagram depicting a master storage volume and a member of snapshots of the master storage system volume taken at different times.

With reference to FIG. 4, a master storage volume 404 and a number of snapshots or snapshot volumes 408 of that storage volume taken at different times T0-Tx are depicted. As used herein, a snapshot 408 is a virtual volume that represents the data that existed on the master storage volume 404 at the point in time that the snapshot 408 was taken. The master storage volume 404 is the current set of data maintained on the data storage system 104. The master storage volume 404 may correspond to a standard RAID volume or LUN. In the example of FIG. 4, the first (oldest) snapshot taken of the storage volume is snapshot 408*a*, which was taken at time T0. The next oldest snapshot 408*b* was taken at time T1. The most recent of the fixed or stored snapshots 408 in the example of FIG. 4 is snapshot 408*c*, which was taken at time T2. The current snapshot 412 is not yet fixed. Accordingly, the data encompassed by the current snapshot 412 changes as the data in the master storage volume 404 changes. The time for the current snapshot 412 is shown as Tx, as it has not yet been fixed. If a command to fix the current snapshot 412 is received (e.g. as a result of operation of an automatic process for determining when snapshots are taken or a decision by an administrator), that snapshot would be associated with time T4 and would become a completed snapshot. A new current snapshot could then begin to be generated.

Each completed snapshot 408 generally includes metadata describing the data included in the snapshot. In addition, if a block of data in the storage volume 404 is changed or overwritten, the newest completed snapshot 408 containing that block of data will be modified to include a copy of the original block of data. Accordingly, each snapshot 408 includes either a reference to or a copy of each block of data that was included in the master storage volume 404 at the time the snapshot 408 was taken. Furthermore, a copy of a data block referenced by a snapshot 408 can be maintained by an earlier snapshot 408. Accordingly, data blocks can be shared among snapshots 408. However, according to embodiments of the present invention, only one copy of each data block included in the master storage volume 404 in its present state or included in the storage volume at any other time captured by a snapshot 408 is maintained among the blocks of data in the master storage volume 404 or snapshots 408 of the master storage volume.

In addition, embodiments of the present invention allow multiple snapshots 408 from different times to be maintained. Furthermore, even if a restore operation to return the state of the master storage volume 404 represented by a selected snapshot 408 is initiated or even completed, the master storage volume 404 can still be returned to a state represented by any other snapshots 408 that have been taken. For example, if an administrator selects a snapshot 408*b* from time T1 and a restore process for that snapshot 408*b* is initiated or completed, the snapshot 408*a* from an earlier time T0 and the snapshot 408*c* from a later time T2 are still available, for example if the administrator determines that one of the other snapshots 408 would be preferable to the selected snapshot 408*b*. That is, embodiments of the present invention allow all snapshot 408 data and metadata to be maintained to permit the contents of the master storage volume 404 to be rolled backward or forward to any existing snapshot 408. Furthermore, the master storage volume 404 contents can be rolled to a snapshot 408 even before an earlier restore operation to roll the contents of the master storage volume 404 to another snapshot 408 is completed. Therefore, data in a selected state can be made immediately available to a user. In still another aspect of embodiments of the present invention, additional snapshots (i.e. a current snapshot 412) of a restored master storage volume 404 can be taken even while the restore operation is being performed as a background operation.

Figure 5:
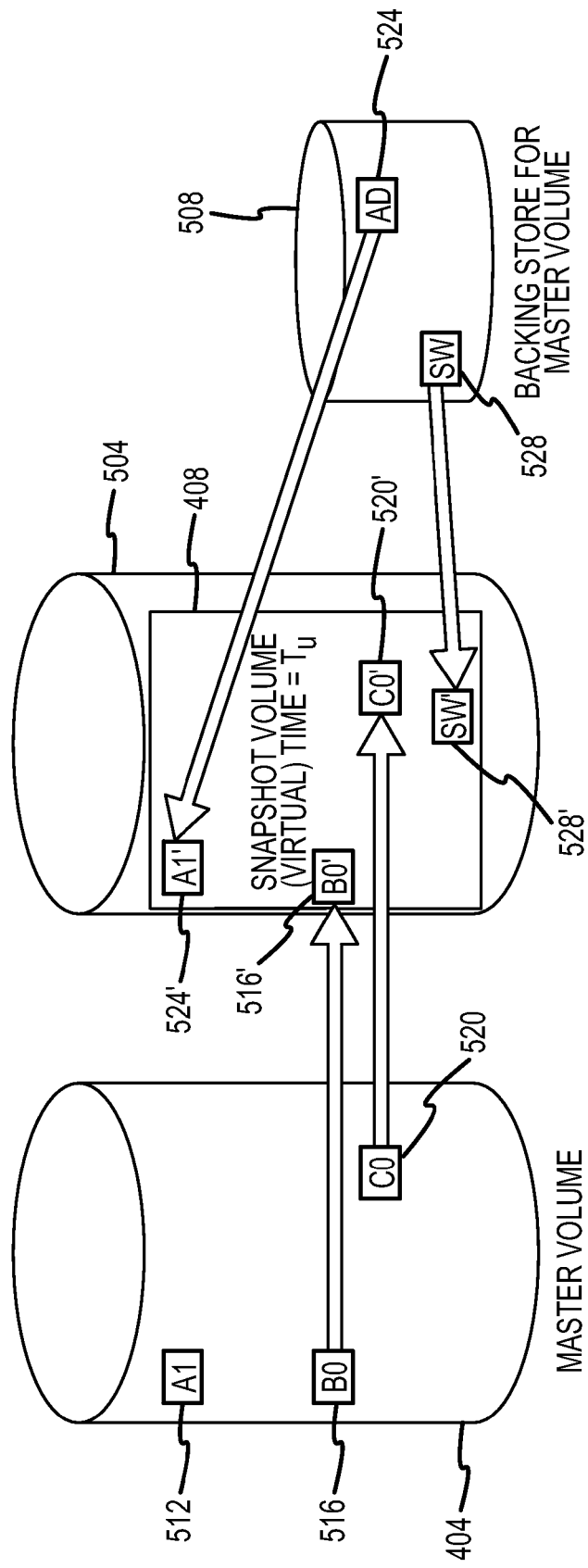
FIG. 5 depicts a relationship between different volumes within a data storage system in accordance with embodiments of the present invention.

With reference now to FIG. 5, the storage of data blocks within a data storage system 104 in accordance with embodiments of the present invention is depicted. In particular, FIG. 5 illustrates a master storage volume 404, a snapshot volume 504, and a backing store for the master volume 508. Within the master storage volume 404, a number of data chunks or blocks A1 512, B0 516, and C0 520 are shown. These data chunks 512-520 represent actual data that is stored as part of the master volume 404 in the data storage system 104.

The snapshot volume 504 is a virtual volume comprising metadata. Accordingly, all data represented as being on a snapshot volume 504 actually exists elsewhere. In particular, the data included in a particular snapshot 408 exits either on the master storage volume 404 or on the backing store 508. More particularly, data that has not been modified since the snapshot 408 was taken exists on the master storage volume 404, while data that has been modified since the snapshot 408 was taken exists on the backing store 508. In general, the backing store 508 has information regarding the master storage volume 404 and virtual snapshot 408 volumes associated with the master storage volume. As can be appreciated by one of skill in the art, the backing store 508 comprises a volume within the data storage system 104. The backing store 508 may be established and controlled by the same controller 212 as the master storage volume 404 associated with the backing store 508. In accordance with other embodiments, the backing store and its contents can be established and controlled by another system node or system component providing the described snapshot restore capabilities, such as a host computer 108, administrative computer 116, server 120 or appliance 124. A single backing store 508 may exist for each snapshot-enabled master storage volume 404. Alternatively, multiple master storage volumes 404 may be assigned to a single backing store 508.

In the example of FIG. 5, the snapshot volume 504 contains a snapshot 408 taken at time T0. The data existing in the master storage volume 404 at time T0 consisted of data chunk A0 524, data chunk B0 516, and data chunk C0 520. At the time depicted at FIG. 5, the master storage volume 404 no longer contains data chunk A0 524. Instead, it contains data chunk A1 512. Accordingly, at the time data chunk A1 512 was received at the data storage system 104 for storage in the master storage volume 404, data chunk A0 524 was copied from the master storage volume 404 to the backing store 508. Therefore, the snapshot 408 for time T0 comprises metadata (shown as A0' 524') indicating that data chunk A0 524 is associated with the snapshot 408 and is located in the backing store 508. The snapshot 408 at time T0 also includes metadata (B0' 516' and C0' 520') indicating that data chunks B0 516 and C0 520 are located in the master storage volume 404. In addition, a data chunk can be shared among snapshots 408. For example, a data chunk that has been overwritten can be associated with the most recent snapshot 408 that includes that data chunk as it existed before being overwritten. Snapshots 408 other than the snapshot 408 associated with the data can then reference that snapshot in metadata, so that the data chunk can be located if needed.

FIG. 5 also illustrates a data chunk SW 528 that was written to the snapshot 408 directly. As can be appreciated by one of skill in the art after appreciation of the present disclosure, a snapshot 408 may comprise a collection of metadata that is actually stored in the backing store 508. Because the snapshot volume 504 does not itself contain data chunks, and instead contains only metadata, the data chunk SW 528 resides on the backing store 508 as chunk SW 528. Accordingly, the snapshot 408 includes metadata SW' 528' indicating that the data chunk SW 528 is located in the backing store 508.

Figure 6:
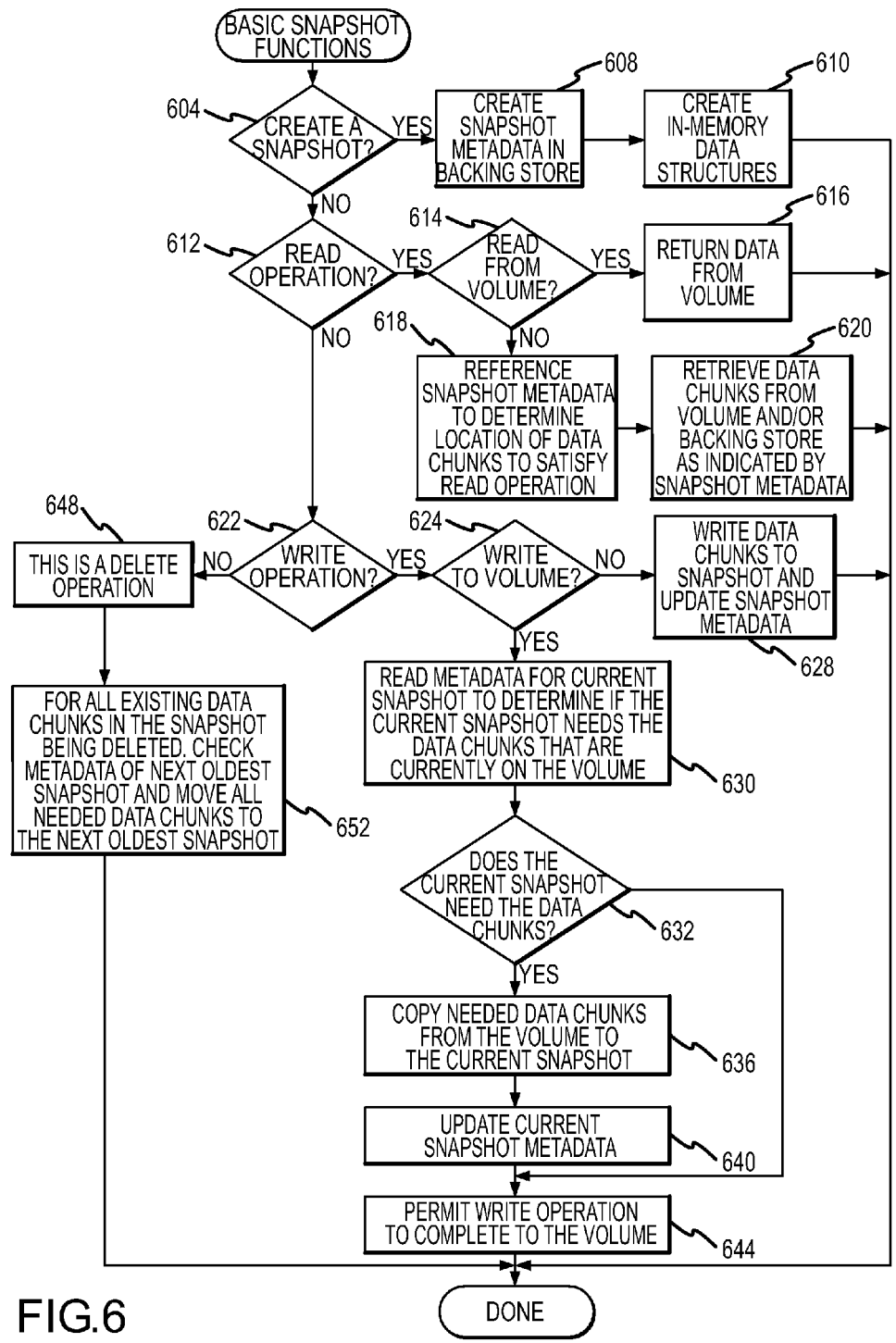
FIG. 6 is a flow chart depicting aspects of a snapshot process in accordance with embodiments of the present invention.

With reference now to FIG. 6, aspects of the operation of a data storage system 104 in handling IO operations to a master storage volume 404 in accordance with embodiments of the present invention are illustrated. Such operations may be performed in connection with the execution of controller code 326 instructions. More particularly, such operations may be performed by execution of a main IO process 332 of the snapshot restore algorithm 328. Such operations may also be performed by execution of a main ID process 332 of a snapshot restore algorithm 328 executed by another system node or system component (e.g. by host computer 108, administrative computer 116, server 120 or appliance 124). Initially, at Step 604, a determination is made as to whether the IO operation to be performed comprises the creation of a snapshot 408 of the master storage volume 404. If a snapshot 408 is to be created, metadata referring to the data in the master storage volume 404 is written to the snapshot volume 504 in the backing store 508, thereby creating a virtual snapshot 408 of the data (step 608). At the instant the snapshot 408 is created, it is entirely metadata, as all the data for the snapshot resides in the master volume 404. At step 610, in-memory data structures are created, to allow snapshot information to be read directly from memory.

If it is determined in Step 604 that a snapshot is not to be created, a determination may next be made as to whether a read operation is to be performed (step 612). If a read operation is to be performed, a determination is made as to whether data is to be read from the master storage volume 404 (step 614). If the data is to be read from the master storage volume 404, the data is read from that volume 404 (step 616). If data is not to be read from the master storage volume 404, the metadata in the snapshot volume 504 relating to the target snapshot 408 is referenced to determine the actual location of the data chunk or chunks needed to satisfy the read operation (step 618). For example, in accordance with embodiments of the present invention, a data chunk associated with a snapshot 408 may reside in the master storage volume 404 or in the backing store 508. The data chunk or chunks are then retrieved from the master storage volume 404 or the backing store 508 as indicated by the snapshot 408 metadata (step 620).

After a determination at step 612 that a read operation directed to a snapshot has not been received, a determination is made as to whether a write operation has been received (step 622). If a write operation has been received, a determination is made as to whether the write operation is directed to the master storage volume 404 (step 624). If the write operation is not directed to the master storage volume 404 and is instead directed to a snapshot 408, the data is written to the backing store 508 and the snapshot metadata is updated (step 628).

If a write operation is directed to the master storage volume 404, the metadata for the current snapshot is read (step 630). A determination is then made as to whether the data chunk that is currently in the master storage volume is needed by the current snapshot 408 (step 632).

If the data chunk about to be overwritten is needed by the current and/or the most recent snapshot 408 (i.e. it is a part of the imaged master storage volume at the point in time represented by the current and/or the most recent snapshot), a copy on write (COW) operation is initiated to write the existing data chunk to the current snapshot (e.g. to the backing store 508) (step 636). The metadata of the most recent snapshot 408 is then updated to indicate that the data chunk is now located in the backing store 508 (step 640). After copying the needed data chunks from the master storage volume to the current snapshot and updating the current snapshot metadata, or after determining that the current snapshot does not need the data chunks that are to be overwritten as part of the write operation, the write operation is completed to the master storage volume (step 644).

If at step 622 it is determined that the operation is not a write operation, the operation must be a delete operation (step 648). For all existing data chunks in the snapshot being deleted, the metadata of the next oldest snapshot 408 is checked, and all data chunks included in the snapshot being deleted that are needed by the next oldest snapshot 408 are moved to the next oldest snapshot 408 (step 652).

Figure 7:
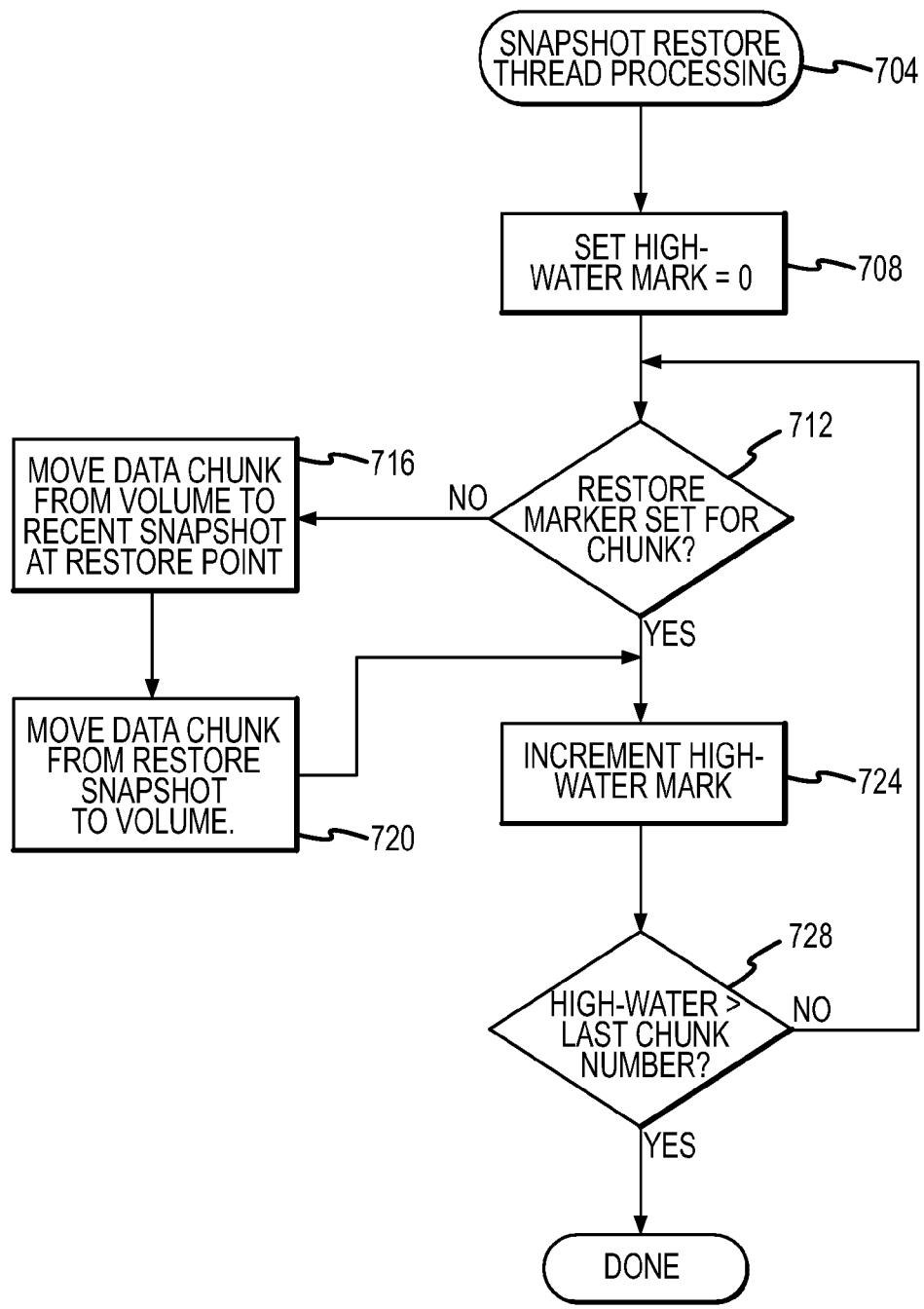
FIG. 7 is a flow chart illustrating aspects of a data restore process in accordance with embodiments of the present invention.

With reference to FIG. 7, aspects of the operation of a data storage system 104 in connection with the restoration of a storage volume 404 to a state represented by a snapshot 408 are illustrated. The restoration process may be performed in connection with the execution of a restore module or process 336. At Step 704 snapshot restore thread processing is initiated. More particularly, the initiation of restore thread processing may be in response to a command to restore the master storage volume 404 to the state represented by a snapshot 408. After initiating restore thread processing, a high-watermark for the master storage volume 404 is set to zero (step 708). At step 712, a next data chunk in the master storage volume 404 is identified, and a determination is made as to whether a restore marker for the data chunk has been set. In general, the restore marker functions to track those chunks of data included in the master storage volume 404 that have been restored to the state represented by the selected snapshot 408.

If the restore marker for the identified data chunk has not been set, a determination is made as to whether the identified data chunk already exists in the snapshot 408 at the restore point (step 714). If the data chunk does not already exist within the snapshot 408, that data chunk is moved from the master storage volume 404 to the most recent snapshot 408 at the restore point (step 716). As can be appreciated by one of skill in the art, moving a data chunk to the most recent snapshot 408 can comprise moving that data chunk to a backing store 508. After moving the data chunks to the most recent snapshot 408, or after determining that the snapshot already exists in the snapshot 408, the data chunk as represented by the restore snapshot 408 is moved from the restore snapshot 408 to the master storage volume 404 (step 720). As can be appreciated by one of skill in the art in view of the description provided herein, the restored data chunk (i.e. the data chunk in the state that it existed at the time the restore snapshot was taken) can be moved to the master storage volume 404 from a location in the backing store associated with the restore snapshot 408 (or from another snapshot 408 referred to in metadata included in the restore snapshot 408). Also after the data chunk is restored, or after determining at step 712 that the restore marker for the selected chunk has been set, the high-watermark within the storage volume is incremented (step 724). The high-watermark identifies the point in the storage volume 404 through which restoration of data chunks has progressed. The high-watermark provides a quick reference that can be used to help determine the action of the data storage system 104 in connection with read and write operations at different points within the master storage volume 404.

After incrementing the high-watermark, determination may be made as to whether the current high-watermark is greater than the chunk number of the last selected data chunk (step 728). If it is determined that the high-watermark is not greater than the number of the last data chunk in the storage volume 404, the process may return to step 712 for processing of the next data chunk. If the high-watermark is determined to be greater than the last chunk number included in the storage volume 404, the process may end. That is, if the high-watermark value is greater than the number of the last chunk, where the chunks are numbered sequentially, every chunk in the master storage volume 404 will have been restored to the state represented by the restore snapshot 408.

Figure 8:
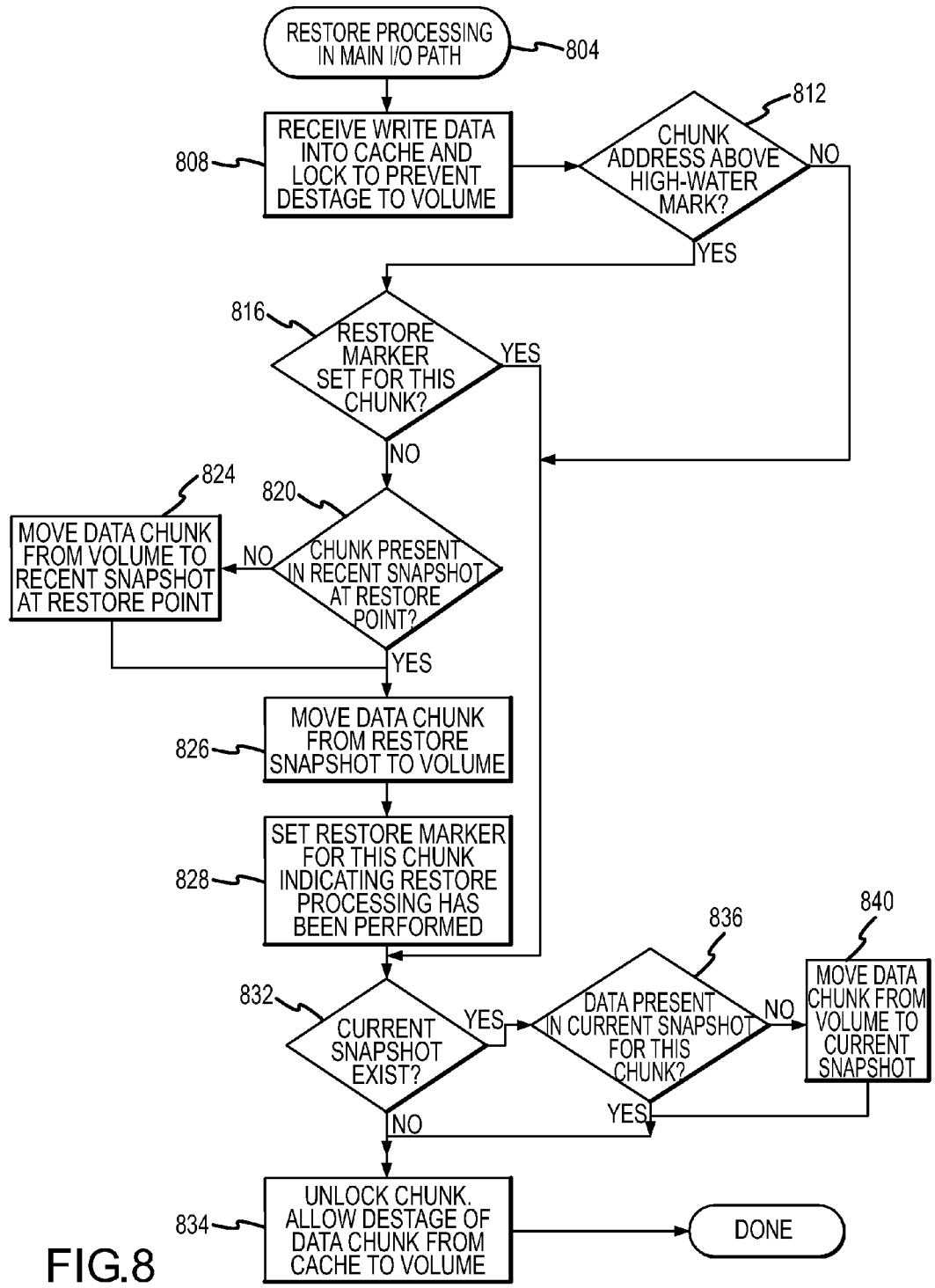
FIG. 8 is a flow chart illustrating aspects of a process for writing data to a storage volume in accordance with embodiments of the present invention.

With reference now to FIG. 8, aspects of the operation of a data storage system 104 in connection with receiving data for writing to a master storage volume 404 while a restore operation or restore processing to return a state of the master storage volume 404 to a state represented by a restore snapshot 408 is in progress are illustrated. Such operations may be performed by the execution of a snapshot restore application or algorithm 328. Initially, restore processing in the main IO path is in progress (Step 804). At step 808, data for writing to the master storage volume 404 comprising at least a first data chunk is received into a cache (for example in memory 306) and is locked to prevent destage of the write data to the master storage volume 404. At Step 812, a determination is made as to whether the chunk address (i.e. the target address) for the write operation is above the high-watermark. If the target LBA range is above the high-watermark, a determination is next made as to whether restore processing for the data chunks in the target LBA range has been completed (i.e. whether the target address for the received data chunk contains an existing data chunk that has been restored), by determining whether a restore marker has been set for the data chunk at the indicated address in the master storage volume 404 (step 816).

If the restore marker has not been set for the data chunk under consideration, a determination is made as to whether the data chunk is present in a recent snapshot 408 at the restore point (step 820). If the data chunk is not present in the recent snapshot 408, the data chunk is moved from the master storage volume 404 to the recent snapshot 408 at the restore point (step 824). After moving the data chunk from the master storage volume 404 to the recent snapshot 408 at the restore point, or after determining that the data chunk is present in the recent snapshot 408 at the restore point, the data chunk is moved from the restore snapshot 408 to the storage volume 404 (step 826). The restore marker for the data chunk that was moved at step 824 is then set, indicating that restore processing has been performed on that data chunk (828).

After completing restore processing and setting the marker for the data chunk at step 828, after determining at step 812 that the chunk address is not above the high-watermark, or after determining at step 816 that the restore marker has been set for the data chunk, a determination is made as to whether a current snapshot exists (step 832). If a current snapshot is found to exist, a determination is made as to whether there is data present in the current snapshot for the selected data chunk (step 836). If the data for the selected data chunk is not present in the current snapshot, the data chunk is moved from the master storage volume 404 to the current snapshot 408 (840). After moving the data chunk from the master storage volume 404 to the current snapshot 408 at step 840, or after determining at step 836 that data is present in the current snapshot for the selected data chunk, or after determining at step 832 that no current snapshot exists, the data chunk held in the cache is unlocked, and the destage of that data chunk from the cache to the master storage volume 404 is allowed (step 844). The received data chunk having thus being written to the master storage volume 404, while preserving any data at the address to which the received data chunk was written as part of any applicable snapshots 408, the process for writing received data during a restore operation may end.

As can be appreciated by one of skill in the art after consideration of the present description, the data storage system 104 in accordance with embodiments of the present invention can accept new data for storage in the master storage volume 404, even while the master storage volume 404 is being restored to a previous state. That is, from a user's perspective, the data restored to a state represented by a selected snapshot 408 is immediately available. Furthermore, data is available in its restored state during a restore operation to roll the master storage volume 404 backward (or forward) to a state represented by a snapshot 408. Accordingly, embodiments of the present invention avoid lengthy delays in data storage system 104 availability with respect to write operations while restoring a storage volume 404. More particularly, from a user or customer perspective, the restore operation is completed immediately (i.e. as soon as it is initiated).

Figure 9:
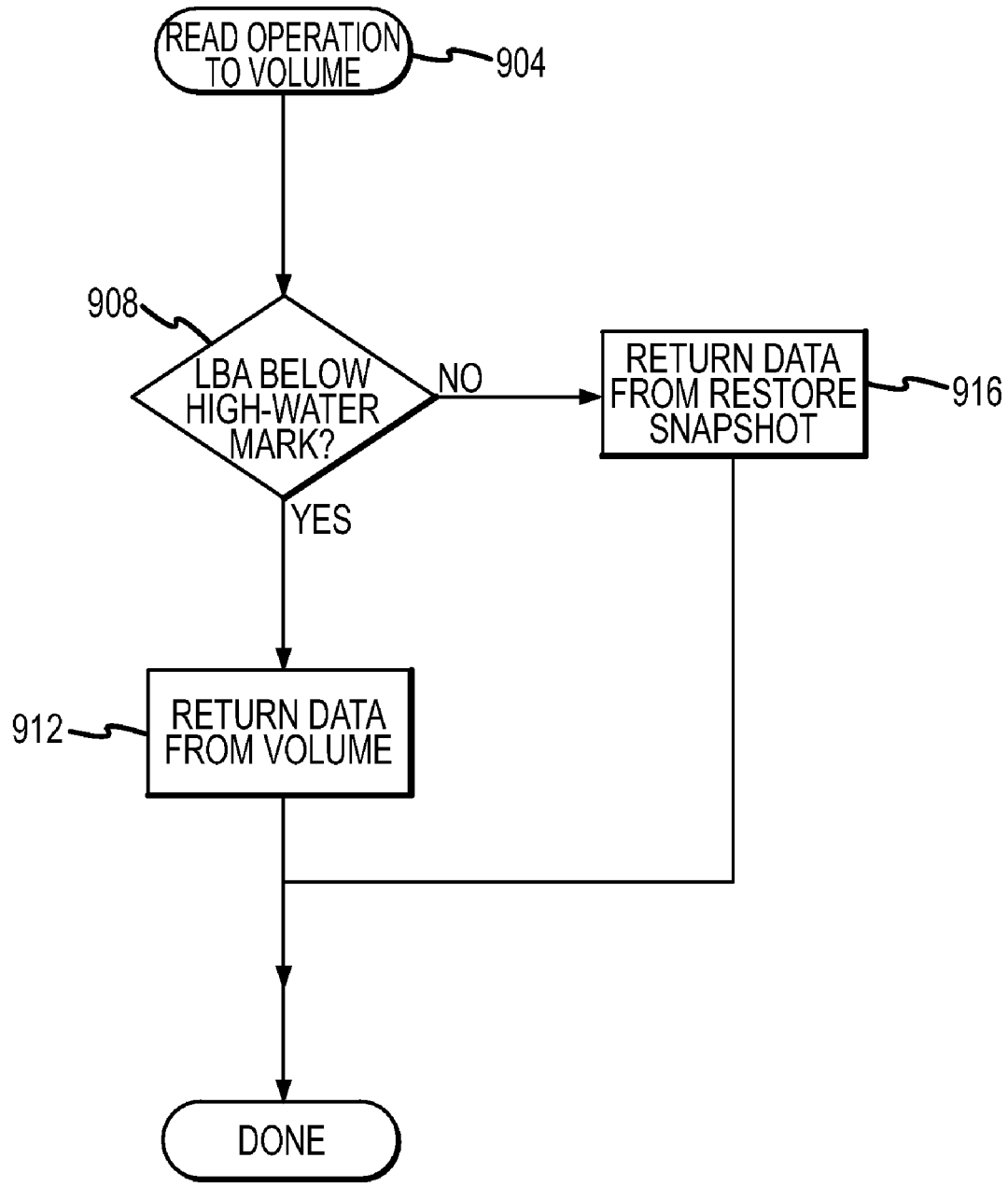
FIG. 9 is a flow chart illustrating aspects of a read process in accordance with embodiments of the present invention.

With reference now to FIG. 9, aspects of the operation of a data storage system 104 in connection with receiving read requests while a restore operation is in progress are illustrated. The included operations may be performed in connection with the execution of snapshot restore code or instructions 324 and various modules of that code. Initially, at Step 904, a read operation directed to the master storage volume 404 is received while a restore operation is in progress. At Step 908, a determination is made as to whether the LBA range for the read operation is below the high-watermark. If the LBA range for the read operation is below the high-watermark, the requested data is returned from the master storage volume 404 (Step 912). That is, the data below the high-watermark has already been restored to the state it was in at the point in time represented by the selected snapshot 408. If it is determined at step 908 that the LBA range for the requested data is not below the high-watermark, the requested data is retrieved from the restore snapshot 408 (or the location indicated by the restore snapshot 408, which can be either the master storage volume 404 or a location in the backing store 508)(step 916).

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art.

What is claimed is:

1. A storage volume snapshot method, comprising:
    initiating a first restore operation to return a state of a master storage volume to a previous state represented by a first snapshot of the master storage volume;
    immediately following initiation of the first restore operation and during the first restore operation, reading data from the master storage volume, wherein the data read from the master storage volume is in the state represented by the first snapshot of the master storage volume;
    while the restore operation is in progress, receiving from a host a first data chunk for writing to a first target address in the master storage volume;
    after receiving the first data chunk, determining whether the first target address contains an existing data chunk that has been restored to the state represented by the first snapshot;
    in response to determining that the first target address contains an existing data chunk that has not been restored to the state represented by the first snapshot:
        moving the data chunk for the first target address maintained as part of the first snapshot to the target address in the master storage volume, wherein on completion of moving the data chunk the first target address contains a restored data chunk;
        writing the first chunk of data to the first target address in the master storage volume, wherein the restored data chunk at the master storage volume is overwritten.

2. The method of claim 1, further comprising:
    in response to determining that the existing data chunk is included in a most recent snapshot, moving the existing data chunk from the first target address to the most recent snapshot.

3. The method of claim 2, wherein moving the existing data chunk from the first target address to a most recent snapshot comprises moving the existing data chunk from the master storage volume to a backing store and associating said existing data chunk on the backing store with the most recent snapshot in metadata comprising the most recent snapshot.

4. The method of claim 1, further comprising:
    in response to determining that a current snapshot exists:
        after moving the data chunk for the first target address maintained as part of the first snapshot to the first target address in the master storage volume so that the first target address contains a restored data chunk, copying the restored data chunk to the current snapshot, wherein the first chunk of data is not written to the first target address in the master storage volume until copying the restored data chunk to the current snapshot has been completed.

5. The method of claim 1, further comprising:
    setting a restore marker associated with the restored data chunk in the first target address in the master storage volume to indicate that the restore operation for the chunk of data at the target address in the master storage volume has been completed.

6. The method of claim 1, further comprising:
    in response to determining that the first target address contains a data chunk that has been restored to the state represented by the first snapshot, writing the first chunk of data to the first target address in the master storage volume.

7. The method of claim 1, wherein determining whether the first target address for the first data chunk contains a data chunk that has been restored to the state represented by the first snapshot includes determining whether the first target address is above a high-watermark.

8. The method of claim 7, wherein determining whether the first target address for the first data chunk contains a data chunk that has been restored to the state represented by the first snapshot further includes determining whether a restore marker associated with the data chunk at the first target address is set.

9. The method of claim 1, wherein moving the data chunk for the first target address maintained as part of the first snapshot to the target address in the master storage volume comprises moving the data chunk for the first target address maintained as part of the first snapshot from a backing store to the target address in the master storage volume.

10. The method of claim 1, wherein said method is performed by a data storage system controller.

11. The method of claim 10, wherein said data storage system controller comprises a RAID array data storage system controller.

12. The method of claim 1, wherein the master storage volume comprises a logical unit number.

13. The method of claim 1, further comprising:
canceling the restore operation during the restore operation and returning the master storage volume to a state prior to execution of the restore operation that is different than the state represented by the first snapshot, wherein returning the master storage volume to a state prior to execution of the restore operation comprises restoring the master storage volume to a state represented by a second snapshot.

14. A storage volume snapshot method, comprising:
initiating a first restore operation to return a state of a master storage volume to a previous state represented by a first snapshot of the master storage volume;
immediately following initiation of the first restore operation, reading data from the master storage volume, wherein the data read from the master storage volume is in the state represented by the first snapshot of the master storage volume;
while the restore operation is in progress, receiving from a host a first data chunk for writing to a first target address in the master storage volume;
after receiving the first data chunk, determining whether the first target address contains an existing data chunk that has been restored to the state represented by the first snapshot;
in response to determining that the first target address contains an existing data chunk that has not been restored to the state represented by the first snapshot:
moving the data chunk for the first target address maintained as part of the first snapshot to the target address in the master storage volume, wherein on completion of moving the data chunk the first target address contains a restored data chunk;
writing the first chunk of data to the first target address in the master storage volume, wherein the restored data chunk at the master storage volume is overwritten;
while the restore operation is in progress, receiving a read request directed to a second target address in the master storage volume;
in response to receiving the read request, determining whether the second target address is below a high-water mark;
in response to determining that the second target address is not below the high-watermark, retrieving the requested data from the first snapshot;
in response to determining that the second target address is below the high-watermark, retrieving the requested data from the master storage volume.

15. The method of claim 14, wherein the requested data is retrieved from the first snapshot, and wherein retrieving the requested data from the first snapshot comprises retrieving data identified in metadata included in the first snapshot from a backing store.

16. A data storage system, comprising:
at least one of a controller, a storage appliance, and a computer, including:
memory;
snapshot restore instructions loaded into the memory;
a processor, wherein the processor executes the snapshot restore instructions, and wherein the execution of the snapshot restore instructions includes execution of a snapshot restoration process;
a storage device interconnected to the at least one of a controller, a storage appliance, and a computer the storage device containing:
a master storage volume;
snapshot metadata; and
a backing store, wherein during execution of a controller code in connection with a restore operation to restore a state of the master storage volume to a state represented by a first snapshot, data in the state represented by the first snapshot is available from one of the master storage volume and the backing store, without requiring that the data first be moved from the backing store to the master storage volume, wherein a high-watermark is maintained to indicate whether or not requested data associated with a target address can be retrieved from the first snapshot or the master storage volume based on whether or not the target address is below the high-watermark.

17. The system of claim 16, wherein the high-watermark is further maintained to indicate a last address in the master storage volume that has been restored to the state represented by the first snapshot, wherein in response to receiving a write request during the restore operation to a first address above the high-watermark, existing data at the first address is moved to the backing store and associated with a recent snapshot, data to be restored to the first address is moved from the backing store to the first address in the master storage volume, and data from the write request is written to the first address in the master storage volume, wherein the data restored to the first address is overwritten by the data from the write request.

18. The system of claim 16, wherein the system includes a number of storage devices, and wherein the master storage volume comprises a RAID array partition established over a plurality of the storage devices.

19. A data storage system, comprising:
means for storing data, said data including data comprising a master storage volume, metadata comprising at least a first snapshot, and data associated with said at least a first snapshot that is not included in said master storage volume;
means for controlling data input/output operations to the means for storing data, including:
means for storing program instructions for execution;
means for executing said stored program instructions;
wherein said program instructions include:
instructions for implementing a process for taking a snapshot of said master storage volume at a point in time,
instructions for restoring a state of the master storage volume to a state of that master storage volume at a point in time represented by the first snapshot, wherein during execution of instructions for restoring a state of said master storage volume to a point in time represented by said first snapshot, in response to receiving a write request directed to a first address in said master storage volume a determination is made as to whether said first address in said master storage volume contains a chunk of restored data, in response to determining that the first address in the master storage volume contains a chunk of restored data, completing said write request.

20. The system of claim 19, further comprising:

means for administering;

wherein said means for controlling data input/output operations further comprises:

means for interfacing, wherein at least a second set of execution instructions is received from said means for administering.

21. The system of claim 19, further comprising:

means for hosting data in communication with said means for controlling data input/output operations, wherein data is written to and read from said means for storing data by said means for hosting data through said means for controlling data input/output operations.

22. A storage volume snapshot method, comprising:

initiating a first restore operation to return a state of a master storage volume to a previous state represented by a first snapshot of the master storage volume;

while the restore operation is in progress, receiving a read request directed to a first target address in the master storage volume;

in response to receiving the read request, determining whether the first target address is below a high-water mark;

in response to determining that the first target address is not below the high-watermark, retrieving the requested data from the first snapshot;

in response to determining that the first target address is below the high-watermark, retrieving the requested data from the master storage volume.

* * * * *